M. PETTERSON.
AIR CUSHION CONSTRUCTION.
APPLICATION FILED JAN. 20, 1920. RENEWED MAR. 2, 1922.
1,416,233.    Patented May 16, 1922.
2 SHEETS—SHEET 1.
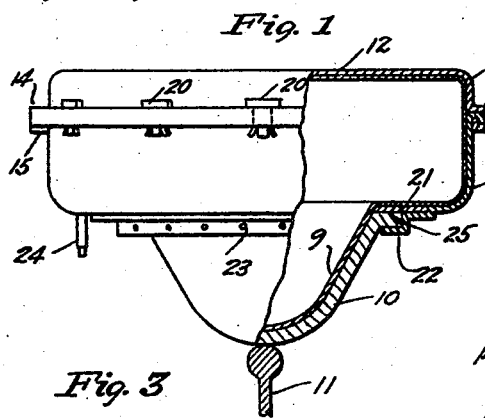
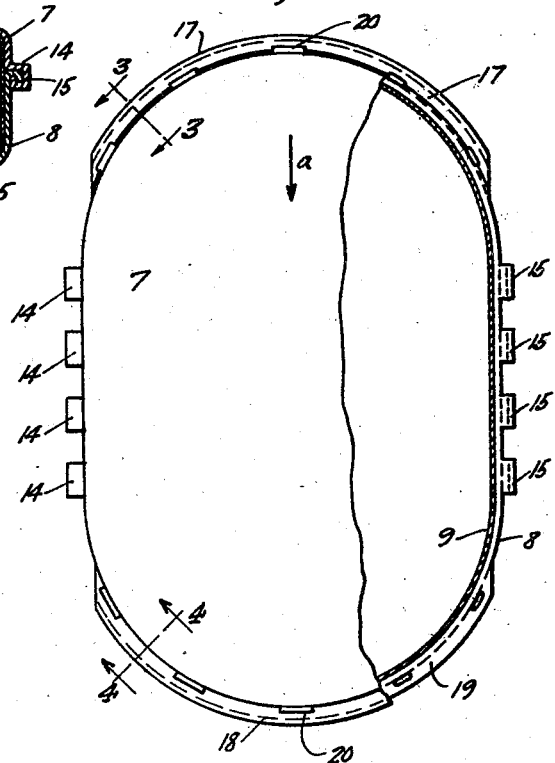
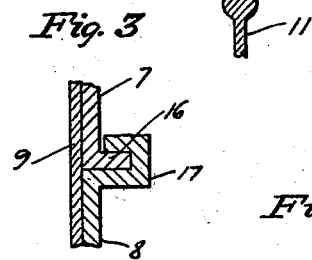
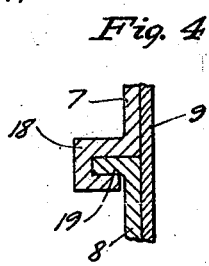
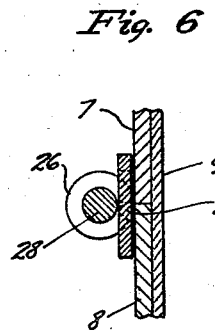
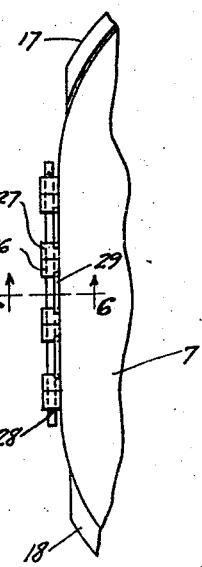
Inventor
Magnus Petterson
by Westall and Wallace
his Attorneys M. PETTERSON.
AIR CUSHION CONSTRUCTION.
APPLICATION FILED JAN. 20, 1920. RENEWED MAR. 2, 1922.

1,416,233.

Patented May 16, 1922.
2 SHEETS—SHEET 2.

Inventor
Magnus Petterson
by Westall and Wallace
his Attorneys

UNITED STATES PATENT OFFICE.

MAGNUS PETTERSON, OF LONG BEACH, CALIFORNIA.

AIR-CUSHION CONSTRUCTION.

1,416,233. Specification of Letters Patent. Patented May 16, 1922.

Application filed January 20, 1920, Serial No. 352,824. Renewed March 2, 1922. Serial No. 540,571.

*To all whom it may concern:*

Be it known that I, MAGNUS PETTERSON, a citizen of the United States, residing at Long Beach, in the county of Los Angeles and State of California, have invented new and useful Improvements in an Air-Cushion Construction, of which the following is a specification.

This invention relates to an air cushion for absorbing the vibrations of one body supported upon another; and pertains particularly to a cushion construction consisting of a pneumatic absorber secured to one body and a deformer in contact therewith and secured to another body.

It is the primary object of this invention to provide an absorber construction having a rigid container for the resilient absorber elements, which is simple in structure, rigid, easily assembled and disassembled, and does not require bolts, rings, nuts, and the like. It is a further object of this invention to provide a container consisting of two parts, with a clincher bottom and a cover of novel structure.

Figure 7:
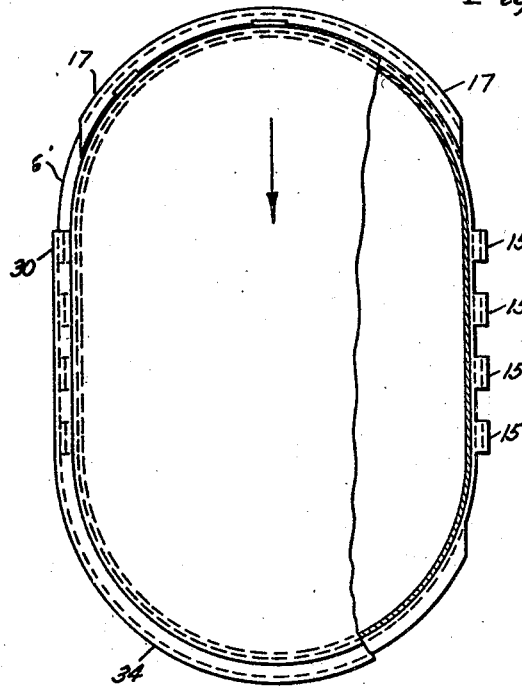
Figure 8:
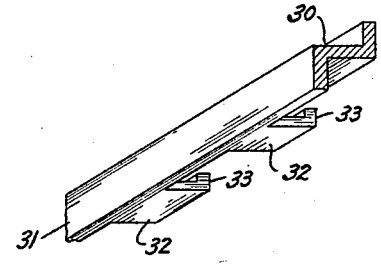
Figure 9:
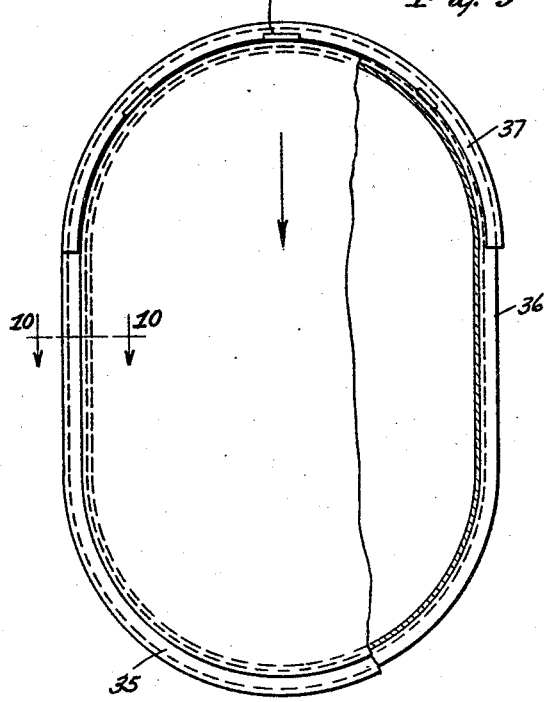
Figure 10:
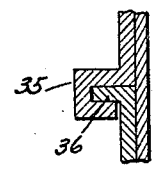

These objects together with other objects and corresponding accomplishments will be more fully understood from the following detailed description of embodiments of the invention. For the purpose of this description, reference is had to the accompanying drawing, in which:

Fig. 1 is an end elevation of one form of complete absorber partly in section; Fig. 2 is a plan view partly in section of the construction shown in Fig. 1; Fig. 3 is an enlarged fragmentary section taken on the line 3—3 of Fig. 2; Fig. 4 is an enlarged fragmentary section taken on the line 4—4 of Fig. 2; Fig. 5 is a fragmentary plan view of a modified form of connection at the side; Fig. 6 is an enlarged fragmentary section taken on the line 6—6 of Fig. 5; Fig. 7 is a plan view partly in section of another modified form of construction; Fig. 8 is an enlarged perspective view of a fragment of the locking lugs on the upper cover as used in the construction shown in Fig. 7; Fig. 9 is a plan view of a further modified form of construction; and Fig. 10 is an enlarged section taken on the line 10—10 of Fig. 9.

Referring more particularly to Figs. 1 to 4 inclusive, the cover for the absorber container is indicated by 7 and is shown mounted upon the clincher bottom of the container 8. Disposed within the container is the resilient absorber lining 9 protected by a casing 10 where it protrudes through an opening in the container. In contact with the absorber casing is a deformer, a fragment of which is indicated in section by 11 in Fig. 1.

The container is shown herein as oval in plan, but in practice may be of any other geometrical shape as found convenient. It has a flat top 12. At the long side of the oval cover are lock lugs 14, which are spaced apart at distances equal to the length of the lugs. These lugs extend laterally from the cover, are bent downwardly parallel to the sides of the container and formed with a return bend, so that in effect a hook is provided. Extending laterally from the bottom are lock lugs 15 corresponding in shape to the openings in lugs 14. It is evident that cover 7 may be placed upon bottom 8 with the lugs 14 disposed in the spaces between lugs 15, then by sliding the cover, lugs 15 will lock with lugs 14 as shown in Fig. 1. I have also provided means for locking the ends and permitting sliding of the cover. Referring particularly to Figs. 2 and 3, a rib 16 extends laterally from the end, and bottom 8 is provided with a hook rib 17 to receive in its opening the rib 16. This construction permits the cover when in locked position being moved in the direction of the arrow *a* in Fig. 2. The opposite end of the container is provided with a construction the reverse of that of the other end. Cover 7 has a hook rib 18 which is disposed to engage a rib 19 on the bottom. This construction also permits the cover to be moved in the direction of the arrow *a*. When the cover is in the position shown in Fig. 2, it is securely locked at its periphery. To prevent the cover from sliding after being placed in locked position keys 20 having heads and split shanks are inserted in openings extending through the ribs at the ends, and the split parts spread to hold the keys in position.

An opening is provided in the container bottom for the cushion elements to protrude. The edge of the bottom is bent adjacent the opening to form a recess in which is disposed a ring 21. The recess is of such dimensions that ring 21, when disposed therein will be flush with the inner surface of the container. Ring 21 is preferably spot welded to the bottom forming a permanent connection. The edge of the container at the opening is further offset as indicated by 22 to form a clincher pocket between it and the ring 21, in which the head of the absorber casing may be disposed. In order to provide for the forcing of the bead of the casing from the clincher pocket, openings 23 are provided for the purpose of permitting the entrance of a rod or tool into the pocket and forcing the bead therefrom.

The inner lining 9 of the cushion may be of rubber similar to the inner tube of a pneumatic tire. This lining is continuous and forms a receptacle for air. In order to inflate the cushion, a valve 24 is secured thereto and extends through an opening in the container. Covering the protruding parts of the lining is a casing 10, preferably of the same character as a tire casing. The casing has a bead 25 adapted to be disposed in the clincher pocket, one corner of the bead being bevelled so that it can be easily slipped into position in the pocket. To assemble the device, cover 7 is removed from the bottom of the container and lining 9 placed in position. The cover is then placed upon the bottom and slipped to locked position, keys 20 being placed in position and the split ends bent to lock the cover against sliding. Casing 10 is contracted so that the bead 25 may be disposed in position to enter the clincher pocket. The casing is then permitted to expand so that the bead enters the pocket. The cushion is then inflated by forcing air through valve 24.

Referring particularly to Figs. 5 and 6, a modified form of locking means for the cover and bottom of the container are shown. The ends may be constructed in the type of device just described. Extending from the cover are knuckles 26 disposed to register with knuckles 27 formed on the bottom 8. The knuckles are spaced apart so that the cover may be moved so as to slide the ends into and out of locking engagement. Extending through the opening in the knuckles are pins, one being indicated by 28. When the cover is closed and in locking position, pairs of knuckles 26 and 27 will be in contact with one another. The pins 28 are then disposed in position and a locking key 29 slipped between the pin 28 and the container wall. Key 29 may have split ends, which can be spread so as to prevent the key from being accidentally removed. Key 29 acts as a stop to prevent the cover from being moved and the ends from becoming disengaged.

Referring to Figs. 7 and 8, the bottom side locking ribs and lugs are constructed as for the structure heretofore described. Instead of having spaced locking lugs on the cover a continuous rib 30 is provided which has a depending portion 31. On the underside of 31 are fingers 32 with the ends 33 turned inward to form hooks. The fingers 32 are spaced apart distances equal to the lugs 15 on the bottom. It is obvious that fingers 32 may be slipped downward between lugs 15 and the cover slid to locking position as with the structure shown in Figs. 1 to 4. The rib 30 may be extended continuously around one end as indicated by 34 and formed as shown in Fig. 3. The rib 16' corresponding to 16 shown in Fig. 3 may be joined to rib 30 and made continuous therewith. By making the rib continuous, a stronger structure is obtained.

Referring to Figs. 9 and 10, a hook rib 35 on the cover extends around one end and the two sides of the cover. This rib merges into a flat rib at the other end as shown in Fig. 3. On the bottom is a flat rib 36 for cooperating with rib 35. Rib 36 merges at the other end with a hook rib 37 of the character shown in Fig. 3. With this construction the cover must be started at the far end of the bottom. Keys 38 are provided to hold the cover and bottom in locked position.

What I claim is:

1. In an absorber, the combination of a rigid container comprising a bottom and a cover having slip locking means, said bottom having an opening with the walls thereof offset to form a recess, a ring secured over said offset to form a clincher pocket; a closed resilient lining in said container and protruding through said opening; and a flexible casing to cover the protruding parts of said lining, said casing having a lateral bead to engage said pockets.

2. In an absorber, the combination of a rigid container comprising a bottom and a cover having slip locking means, said bottom having an opening with the walls thereof formed with a double offset, a ring filling the first offset to lie flush with the inner wall of said bottom and permanently secured thereto, said ring forming with the second offset a clincher pocket; a closed resilient lining in said container and protruding through said opening; and a flexible casing to cover the protruding part of said lining, said casing having a lateral bead to engage said pockets.

In witness that I claim the foregoing I have hereunto subscribed my name this 9th day of January, 1920.

MAGNUS PETTERSON.